March 17, 1931.  F. S. DENISON  1,796,511
BATTERY CUT-OUT SWITCH
Filed Jan. 19, 1927  2 Sheets-Sheet 1

INVENTOR
FREDERICK S. DENISON
BY *Paul, Paul & Moore*
ATTORNEYS

March 17, 1931.    F. S. DENISON    1,796,511
BATTERY CUT-OUT SWITCH
Filed Jan. 19, 1927    2 Sheets-Sheet 2
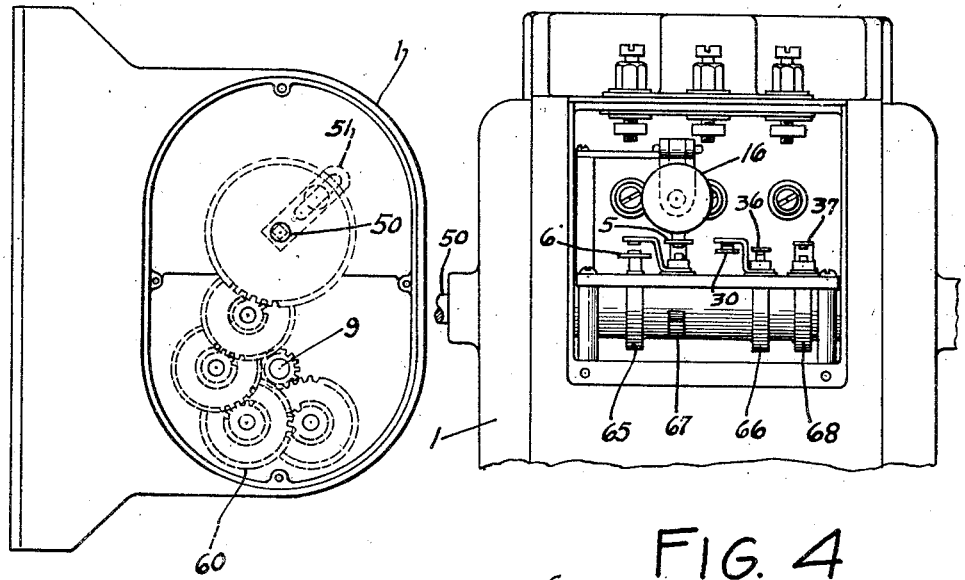
FIG. 4
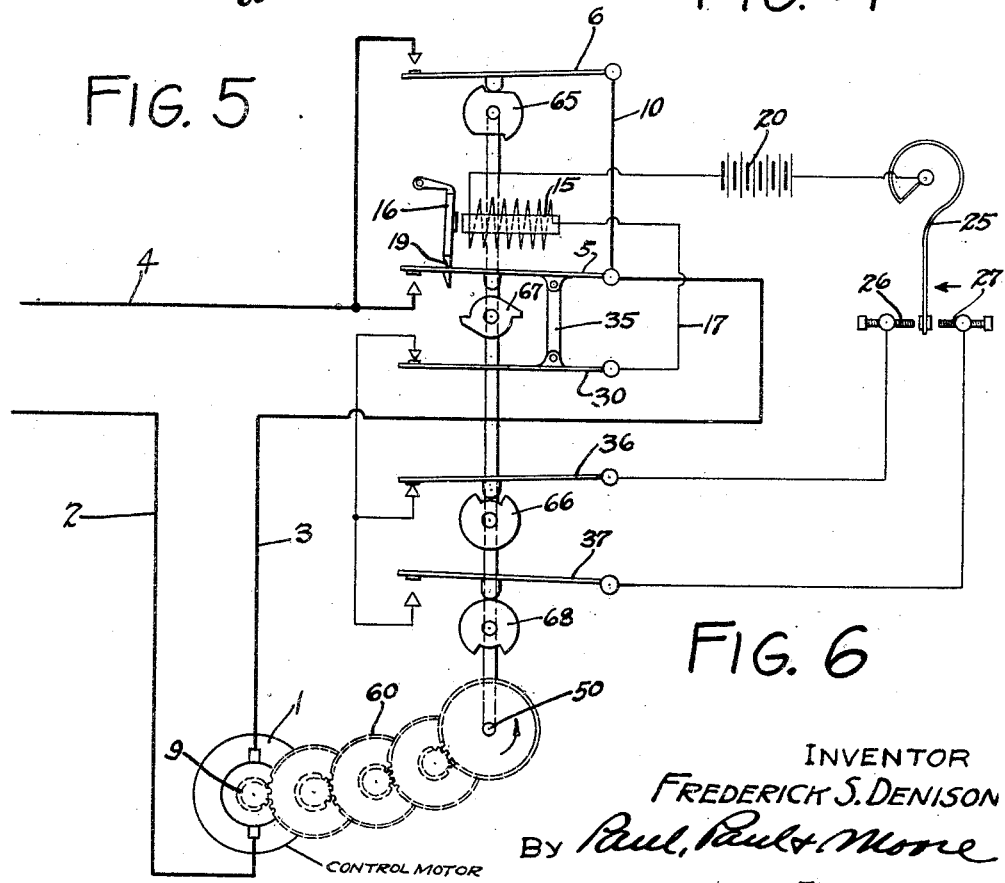
FIG. 5
FIG. 6
INVENTOR
FREDERICK S. DENISON
BY Paul, Paul & Moore
ATTORNEYS

Patented Mar. 17, 1931

1,796,511

UNITED STATES PATENT OFFICE

FREDERICK S. DENISON, OF MINNEAPOLIS, MINNESOTA, ASSIGNOR, BY MESNE ASSIGNMENTS, TO MINNEAPOLIS-HONEYWELL REGULATOR COMPANY, OF MINNEAPOLIS, MINNESOTA, A CORPORATION OF DELAWARE

BATTERY-CUT-OUT SWITCH

Application filed January 19, 1927. Serial No. 162,132.

This invention relates generally to a thermostatically operable motor controlling apparatus, such as is used for heat regulation, and is particularly directed to means for preventing drainage of a battery used in conjunction with a relay or pilot circuit for controlling current to a control motor. An object is to control the battery and relay or pilot circuit of the device so that either during power failure, in the motor line, or throughout the normal operating cycle of the motor, the battery circuit will be open. In other words, the object is to provide a device wherein the battery is only momentarily operative to initiate the closing of the main switch.

Another object of the device is to provide a motor having control switches, and to provide a relay circuit having a relay for latching one of the switches in open position, the relay being energized by a battery and the battery and relay being in circuit with a thermostatic element operable between two contacts, to provide switches in the relay circuit for separately controlling the circuit, certain of the switches being connected to alternately open and close the circuit to one of the thermostatic contacts; and to provide means which are operable by the motor to control the switches to open the relay and battery circuit immediately after the motor circuit is closed, and to hold the same open during power failure as well as during the normal cycle operation of the device, and to condition the relay circuit for alternate control through either thermostatic contact.

Features of the invention include the details of construction of the switching and switch control device in conjunction with a motor, as well as the system of control for the purpose set forth.

Further objects, advantages and features will appear in the description of the drawings forming a part of this application, and in said drawings Figure 1 is a top plan view of a motor having associated therewith the switch and switch control mechanism according to the teachings of this invention;

Figure 4 is a side elevation with the cover plate removed to show the switch mechanism;

Figure 5 is a side elevation of motor with the cover removed to show the object of the gearing; and Figure 6 is a diagrammatic view illustrating the system claimed herein.

Figure 1:
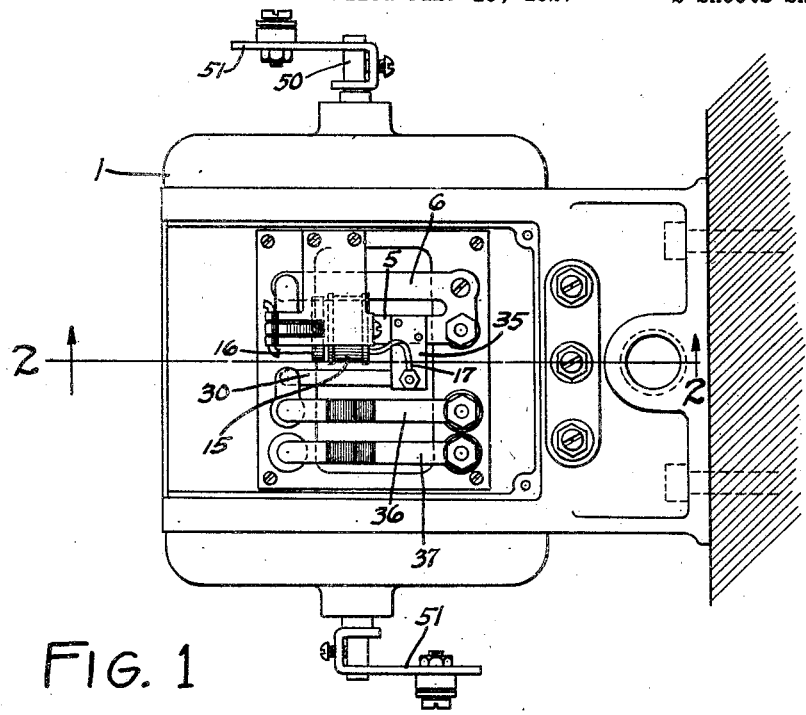

Referring to Figure 6, the numeral 1 indicates the control motor having power line connections 2, 3 and 4, the connections 3 and 4 being controlled by a switch having a spring arm 5 urged toward its contact as a result of spring action. A shunt line around the switch arm 5 is indicated at 10 and is controlled by a second switch having a spring arm 6 urged away from its contact.

Associated with one of the power line switches and adapted to control the switch is a relay 15 having an armature 16 arranged to releasably hold the switch in open position, when the relay is de-energized, and after the arm is forcibly raised to latch position by a cam, in a manner to be described. This armature is further arranged to release the arm 5, and allow the same to spring downwardly and close the main line circuit, when the relay is energized.

A relay circuit is provided having therein the relay above mentioned, and also having a battery 20 for operating the relay, and further having a thermostatic device including a thermo element 25 operable between two contacts 27—26, respectively "hot" and "cold." Three switches are arranged in the relay circuit each independently operable for controlling the circuit. One of the switches has a spring arm 30 mechanically connected as at 35 with the arm 5 of the first main line switch, in such manner that as the main line switch closes the switch arm 30 is moved to break its circuit, and vice versa. The other two switches are connected each to alternately open and close the circuit to one of the thermostatic contacts 26, 27. The spring arms of these switches are respectively designated 36—37, and are urged toward their contacts. The former controls the circuit through the contact 26, and the latter controls the current through the contact 27.

The motor has a cam shaft 50 associated therewith, and this shaft is operably connected with the motor through a train of speed reduction gears generally designated 60. The gears being arranged to give the proper, preferably slow, speed of rotation to the shaft 50. Upon this shaft are arranged in fixed angular relations a series of cams including a cam for each of the main line switches, and a cam for each of those two switches which independently control the circuit through the thermostatic contacts. As shown in Figure 6 the parts of the device are positioned for a call for heat, that is the relay will be energized when the element 25 makes contact at 26. Under these conditions both main line switches are open and therefore the motor is not running. The switch arms 30 and 36 are positioned to close the circuit through the relay battery, element 25, and hot contact 26, and the cold contact control arm 37 is raised and its circuit is therefore open.

Operation

Referring to Figure 6 the battery and relay circuit is conditioned, as before stated, to be energized by a call for heat, when, in this instance, the thermostatic element 25 moves to the left to engage the contact 26. This, because the battery and relay circuit control switch arms 30 and 36 are in closed position. By this contact the relay is energized, and the main switch arm 5 is released, as the result of a swinging movement of the relay armature to the right. The arm 5 springs downwardly and closes the motor circuit, and simultaneously moves the switch arm 30 to open position thus immediately breaking the battery and relay circuit. In case of power failure the motor line remains closed and the battery circuit open, or if there is no power failure the battery and circuit remains broken, the motor operates and the shaft 50 begins its rotation in this instance in counter-clockwise direction. After a few degrees of rotation the cam 65 forces the main switch arm 6 to closed position, and holds the arm in this position during a portion of one cycle of operation of the camshaft, in this instance, during a half rotation. As a result of the closing of this arm 6 a shunt around the switch arm 5 is obtained, thus rendering a closed circuit by the arm unnecessary.

Shortly after the switch arm 6 reaches closed position, the cam 66 raises the switch arm 36 to open the circuit to contact 26 of the thermostat, that is to open the circuit on the hot side.

After this, cam 67 raises the switch arm 5 to latching engagement with the armature 16, the motor line being closed through arm 6. Motion of arm 5 to latch position closes the circuit through arm 30. The cam 68 allows the switch arm 37 to close, this taking place substantially at the end of the first half revolution of the cam shaft, and at this time, arm 6 is lowered to stop the motor. The apparatus is thus conditioned in anticipation of a call for cold, and when contact is made between the element 25 and the contact post 27, a second operating cycle is initiated and is completed in substantially the same manner as above described, at the end of which cycle the parts again assume the position shown in Figure 6.

Motor and switch construction

Figure 2:
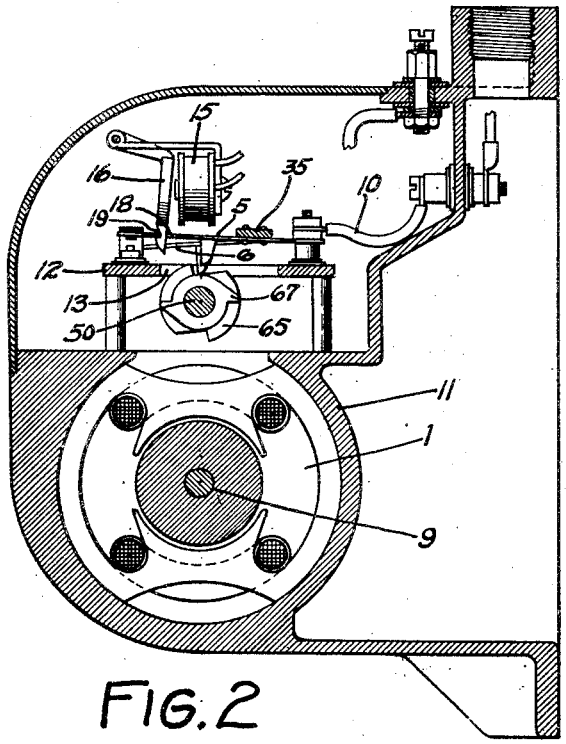
Figure 2 is a vertical section approximately on line 2—2 of Figure 1 showing the main switch open and the shunting main switch closed.
Figure 3:
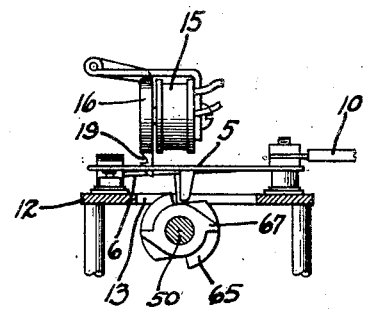
Figure 3 is a detail view substantially on line 2—2 of Figure 1 showing the main switch closed and the shunt switch open.

Referring to Figures 1 to 5, the numeral 1 generally designates a motor of the preferred type, having the usual rotating armature 9. The motor is mounted in a suitable casing 11 and above the motor, in this instance, is mounted the cam shaft 50. The cam shaft and the motor shaft are connected, as before mentioned, by the train of gearing 60, for giving a comparatively slow rotating motion to the cam shaft. Arranged above the shaft 50 is a plate 12 having an opening 13 through which are extended projections carried by the switch arms 5, 6, 30, 36 and 37, and engageable by the cams. These switch arms are each suitably connected at one end by screws, and are herein constructed of resilient material providing a spring-arm structure. The wiring connections are not completely shown inasmuch as these are clearly shown in Figure 6. All the arms are suitably insulated and the arm 30 is connected with the arm 5 by a plate of insulating material indicated at 35. The connection between the arm 30 and one side of the coil of the relay 15 is shown at 17. Thus the main line switch control arm 5 and the switch arm 30 are mechanically connected so that when one arm moves to closed position the other moves to open position. The arm 5 has an opening 18 therein through which the lower end of the armature 16 of the relay projects, see Figure 2. The lower end of the armature is notched as at 19 and when the same swings to the position shown in Figure 6 latching between the arm 5 and said armature takes place. On the other hand when the armature moves in the opposite direction as when the relay is energized the arm 5 is released and springs to closed position.

The cams 65, 66, 67 and 68 are angularly arranged substantially as shown in Figure 6 and the cams 65, 67 are configurated as shown to raise and lower their respective switch arms, or to permit such raising and lowering at every one hundred eighty degrees of rotation of the cam shaft. The cam shaft 50 projects through the motor casing at opposite ends and has thereon cranks 51 adapted to be connected for mechanically operating other elements of a heat regulating device. This feature forms no part of the present invention.

A device is thus provided which will prevent draining of the dry cells used in the pilot or relay circuit of the motor. This protective means remains operative, either during power failure, or normal operating cycle of the motor.

I claim as my invention:

1. A device of the class described comprising, a motor and circuit therefor including first and second control switches, a shunt circuit around the first switch controlled by the second, a relay having an armature arranged to releasably hold the first switch in open position, a circuit for the relay including, a battery, a thermostatic element and hot and cold contact elements engageable thereby, and a switch connected for movement with the first motor control switch, switches in said relay circuit for independently controlling the circuits to the hot and cold contact elements, a shaft driven by the motor and having cams engageable with the switches to close the second motor switch, then open the circuit to one of the thermostatic contacts, then open the first mentioned motor switch, close the circuit to the other thermostatic contact, and finally open the second motor switch.

2. A device of the class described comprising a motor and circuit therefor, including first and second motor control switches, a shunt circuit around the first switch controlled by the second, a relay having an armature arranged to releasably hold the first switch in open position when the relay is de-energized, a circuit for the relay including a battery, a thermo element and hot and cold contacts engageable thereby, and a switch connected with the first mentioned motor control switch, switches in said relay circuit for independently controlling the circuits to the hot and cold contacts, a shaft arranged to be driven by the motor and having cams arranged to engage the switches to close and hold closed the last mentioned main switch, then open and hold open the circuit to one thermostatic contact, throw the motor switch to latch position, and finally close and hold closed the circuit to the other thermostatic contact.

3. A device of the class described comprising a motor and circuit therefor, including a first motor control switch adapted to close by gravity, and a shunt circuit around the first switch arm controlled by a switch adapted to open by gravity, a relay having an armature arranged to be engaged by and releasably hold the first mentioned switch arm in open position when the relay is de-energized, a circuit for the relay including a battery, a thermo element and hot and cold contact posts alternately engageable thereby, and a switch connected with the first mentioned motor control switch to open as that switch closes, and vice versa, switches in said relay circuit for independently controlling the circuit contact posts of the thermostat, a shaft arranged to be driven by the motor and having cams arranged to engage the switch arms in succession to close the last mentioned main switch, open the circuit to one of the thermostatic contacts, then open the first mentioned motor switch, and finally close the circuit to the other thermostatic contact.

4. A device of the class described comprising a motor and circuit therefor, including a first motor circuit control switch having a switch arm adapted to close by gravity, and a shunt circuit around the first switch arm controlled by a second motor circuit control switch having an arm adapted to open by gravity, a relay having an armature as a latch arranged to engage and releasably hold the first mentioned switch arm in open position when the relay is de-energized, a circuit for the relay including a battery, a thermostat having hot and cold contact posts, and a thermo element arranged to alternately engage each post, and a switch having an arm mechanically connected with the first mentioned motor control switch arm to open as the arm closes and vice versa, switches in said relay circuit for independently controlling the circuit respectively to hot and cold contact posts, a shaft arranged to be driven by the motor and having cams arranged to engage the switch arms in succession, in a manner to first close the shunt circuit, then open the circuit to the hot contact post, then open the first motor switch, and finally close the circuit to the cold contact.

5. A device of the class described including a circuit having therein, a thermostat having a thermo element movable between two contacts, a relay, and a battery, relay control switches for independently controlling the circuit to each of the thermostatic contacts, and to the battery and relay, a motor circuit and two switches arranged to alternately control said motor circuit, one of the motor line switches adapted to be held open by the relay armature when the relay is de-energized, and this switch being connected to move one of the relay circuit control switches, and a shaft operable by the motor, having cams thereon respectively engageable with each switch for causing the motor control switches to alternately open and close, and to cause the thermostat contact control switches to alternately open and close.

6. A device of the class described comprising, a motor and circuit therefor including two motor control switches alternately operable to control the motor circuit, a relay having an armature arranged to releasably hold one of the control switches in open position, a circuit for the relay including, a battery, a thermostatic element engageable with hot and cold contacts, and a switch connected with one of the motor control switches to be opened when that switch is closed and vice versa, switches in the said relay circuit for independently controlling the circuits to the hot and cold contacts, a shaft driven by the motor and having cams to engage the switches to close one of the motor control switches then open the circuits to one of the thermostatic contacts, then open the other main switch and finally close the circuit to the other thermostatic contact.

7. A motor and power line and main switch therefor, a relay for controlling the main switch to releasably hold the same open, a battery and thermo device having an element operable between two contacts, a relay circuit having a switch controlling the circuit through the relay, battery and thermo device, said last mentioned switch adapted to open when the main switch closes, and auxiliary switches in circuit with the relay and respectively with the contacts of the thermo device, and means for operating the switches to move the main switch to that position at which it is releasably held and alternately open and close the last mentioned switches.

8. A device of the class described comprising a motor and circuit therefor including first and second control switches, a shunt circuit around the first switch controlled by the second, a relay having an armature arranged to removably hold the first switch in open position, a circuit for the relay including, a battery, a thermostatic element and hot and cold contact elements engageable thereby, a switch arranged to move as result of movement of the first motor control switch, switches in said relay circuit for controlling the circuits to hot and cold contact elements, and means driven by the motor for operating the switches, to close the second motor switch, open the circuit to one of the thermostatic contacts, open the first mentioned motor switch, close the circuit to the other thermostatic contact and open the second motor switch.

9. A motor, and power line and main switch therefor, a relay having an armature arranged to releasably hold the main switch open when the relay is de-energized, a circuit for the relay including a battery, and a thermostatic switch, and a second switch controlling the relay-battery circuit, adapted to open when the main line switch closes, and means driven by the motor for moving the main line switch to position to be latched by the relay armature.

10. A motor and power line and main switch therefor, a relay having an armature arranged to releasably hold the main switch open, a circuit for the relay including a battery, and a thermostatic switch, and a second switch controlling the relay-battery circuit, adapted to open when the main line switch closes, and means driven by the motor for moving the main line switch to position to be latched by the relay armature.

11. A motor, and power line and main switch therefor, a relay having means to releasably hold the main switch open, a circuit for the relay including a battery, and a switch, and a second switch controlling the relay-battery circuit, adapted to open when the main line switch closes, and means driven by the motor for moving the main line switch to position to be releasably held.

12. A motor, and power line and main switch therefor, electrically operable means adapted to releasably hold the main switch open when said means is de-energized, a circuit for said electrically operable means including a battery, a switch controlling the battery circuit and adapted to open when the main line switch closes, and means driven by the motor for moving the main line switch to position to be latched by the holding portion of said electrically operable means.

13. A motor and power line and main switch therefor, a relay having an armature arranged to releasably hold the main switch open when the relay is de-energized, a circuit for the relay including a battery and a thermostatic switch, a second switch controlling the relay battery circuit adapted to open and remain open while the main line switch is closed, and means driven by the motor for moving the main line switch to position to be latched by the relay armature.

In witness whereof, I have hereunto set my hand this 15th day of January, 1927.

FREDERICK S. DENISON.